United States Patent
Carbune et al.

(10) Patent No.: US 11,494,667 B2
(45) Date of Patent: Nov. 8, 2022

(54) SYSTEMS AND METHODS FOR IMPROVED ADVERSARIAL TRAINING OF MACHINE-LEARNED MODELS

(71) Applicant: Google LLC, Mountain View, CA (US)

(72) Inventors: Victor Carbune, Zurich (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 1067 days.

(21) Appl. No.: 15/874,121

(22) Filed: Jan. 18, 2018

(65) Prior Publication Data
US 2019/0220755 A1    Jul. 18, 2019

(51) Int. Cl.
G06N 5/04     (2006.01)
G06K 9/62     (2022.01)
G06N 20/00    (2019.01)
G06N 3/04     (2006.01)
G06N 3/08     (2006.01)

(52) U.S. Cl.
CPC .............. G06N 5/04 (2013.01); G06K 9/6256 (2013.01); G06N 3/0454 (2013.01); G06N 3/084 (2013.01); G06N 20/00 (2019.01)

(58) Field of Classification Search
CPC .......... G06N 5/04; G06N 20/00; G06N 20/10; G06N 20/20; G06N 3/02; G06N 5/00; G06N 3/0454; G06N 3/084; G05B 13/00; G05B 13/027; G05B 13/0285; G05B 13/029; G06K 9/66; G06K 9/6256; G06T 1/20; G10L 15/16
See application file for complete search history.

(56) References Cited

U.S. PATENT DOCUMENTS

2018/0247156 A1*  8/2018  Holtham ................ G06N 20/00
2019/0005386 A1*  1/2019  Chen .................... G06K 9/6274
(Continued)

OTHER PUBLICATIONS

Shen et al., APE-GAN: Adversarial Perturbation Elimination with GAN, Sep. 26, 2017, arXiv:1707.05474v3, 14 pages (Year: 2017).*
(Continued)

*Primary Examiner* — Li B. Zhen
*Assistant Examiner* — William Wai Yin Kwan
(74) *Attorney, Agent, or Firm* — Dority & Manning, P.A.

(57) ABSTRACT

Example aspects of the present disclosure are directed to systems and methods that enable improved adversarial training of machine-learned models. An adversarial training system can generate improved adversarial training examples by optimizing or otherwise tuning one or hyperparameters that guide the process of generating of the adversarial examples. The adversarial training system can determine, solicit, or otherwise obtain a realism score for an adversarial example generated by the system. The realism score can indicate whether the adversarial example appears realistic. The adversarial training system can adjust or otherwise tune the hyperparameters to produce improved adversarial examples (e.g., adversarial examples that are still high-quality and effective while also appearing more realistic). Through creation and use of such improved adversarial examples, a machine-learned model can be trained to be more robust against (e.g., less susceptible to) various adversarial techniques, thereby improving model, device, network, and user security and privacy.

18 Claims, 4 Drawing Sheets

(56) References Cited

U.S. PATENT DOCUMENTS

2019/0213503 A1* 7/2019 Navratil ................. G06F 16/583
2019/0371299 A1* 12/2019 Jiang ......................... G06N 5/00

OTHER PUBLICATIONS

Barreno et al., The security of machine learning, May 20, 2010, Mach Learn (2010) 81:121-148, 28 pages (Year: 2010).*
Kurakin et al., Adversarial Machine Learning at Scale, arXiv:1611.01236v1, Nov. 4, 2016, 15 pages (Year: 2016).*
Luo et al., Towards Imperceptible and Robust Adversarial Example Attacks against Neural Networks, arXiv:1801.04693v1, Jan. 15, 2018, 8 pages (Year: 2018).*
Sax et al., Adversarial Examples in NLP Contexts, retrieved from web.archive.org, dated Feb. 22, 2016 (htttps://web.archive.org/web/20160401000000*/https://nlp.stanford.edu/courses/cs224n/2015/reports/29.pdf), 12 pages (Year: 2016).*
Anonymous, "Synthesizing Robust Adversarial Examples", Nov. 3, 2017, ICLR 2018 Conference Blind Submission, 20 pages.
Goodfellow, "Attacking Machine Learning with Adversarial Examples", Feb. 24, 2017, https://blog.openai.com/adversarial-example-research/, retrieved on Jan. 16, 2018, 10 pages.
Goodfellow et al., "Explaining and Harnessing Adversarial Examples", arXiv:1412.6572v3, Mar. 20, 2015, 11 pages.
Hu et al., "Generating Adversarial Malware Examples for Black-Box Attacks Based on GAN", arXiv:1702.05983v1, Feb. 20, 2017, 7 pages.
Jin et al., "Robust Convolutional Neural Networks under Adversarial Noise", arXiv:1511.06306v2, Feb. 25, 2016, 8 pages.
Miyato et al., "Adversarial Training Methods for Semi-Supervised Text Classification", International Conference on Learning Representations, Toulon, France, Apr. 24-26, 2017, 11 pages.
International Search Report and Written Opinion for PCT/US2018/047057, dated Jan. 4, 2019, 11 pages.
Hitaj et al., "Deep Models Under the GAN: Information Leakage from Collaborative Deep Learning", Proceedings of the 2017 ACM SIGSAC Conference on Computer and Communications Security (CCS-17), Oct. 30, 2017, 16 pages.
Isola et al., "Image-to-Image Translation with Conditional Adversarial Networks", Proceedings of the 2017 IEEE Computer Society Conference on Computer Vision and Pattern Recognition (CVPR-17), Jul. 21, 2017, 10 pages.
Shen et al., "APE-GAN: Adversarial Perturbation Elimination with GAN", arXiv:17007.05474v3, Sep. 26, 2017, retrieved on Nov. 30, 2018, 14 pages.
Zhu et al., "Generative Adversarial Active Learning", arXiv:1702.07956v1, Feb. 25, 2017, retrieved Sep. 25, 2018, 10 pages.

* cited by examiner

SYSTEMS AND METHODS FOR IMPROVED ADVERSARIAL TRAINING OF MACHINE-LEARNED MODELS

FIELD

The present disclosure relates generally to machine learning. More particularly, the present disclosure relates to systems and methods that enable improved adversarial training by tuning one or more hyperparameters that guide the generation of adversarial training examples.

BACKGROUND

Adversarial machine learning lies at the intersection of machine learning and computer security. In particular, malicious actors can perform a number of adversarial techniques that are aimed at fooling machine-learned models by maliciously crafting samples that are not perceived as being different by humans, but in fact reliably fool the model into providing an incorrect output. As one example, an adversarial input may appear to a human observer as a verbal request for navigational instructions but, due to its maliciously crafted nature, will fool a machine-learned model into inferring that the user has requested a transfer of money to a certain account and/or has requested a passcode or passphrase for a system security check.

Thus, some adversarial techniques can use inputs to machine-learned models that an attacker has intentionally designed to cause the model to make a mistake. As such, training machine-learned models to be robust against (i.e., to not be fooled by) adversarial techniques is important for improving model, device, network, and user security and privacy. As machine-learned models become more pervasive across all products and computerized decision making, the ability of machine-learned models to withstand adversarial attacks will become of vital importance.

One aspect of adversarial training includes generating adversarial training examples and then training the machine-learned model using the generated adversarial training examples as additional training examples. In particular, in one example, an adversarial example can be created that the computer misrecognizes but that a human clearly recognizes correctly. This adversarial example can be used as a "positive" training example for the class that the human assigns to it. In such fashion, machine-learned models can be trained to be more robust against adversarial inputs.

The process of generating adversarial training examples is generally guided by one or more hyperparameters that control aspects of the generation process. However, these hyperparameters are highly sensitive to the format of the input data, the nature of the problem being solved, and other facets of the problem/learning structure. Thus, generating adversarial examples that are both effective while also remaining realistic can be a technically challenging, resource-intensive and time-consuming process. In particular, adversarial training examples that are generated need to be realistic, since unrealistic training examples may lead to another type of misinterpretation.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by one or more computing devices, a training example for a machine-learned model. The method includes generating, by the one or more computing devices, an adversarial example from the training example according to one or more hyperparameters. The method includes determining, by the one or more computing devices, a realism score for the adversarial example that indicates whether the adversarial example appears realistic. The method includes adjusting, by the one or more computing devices, at least one of the one or more hyperparameters based at least in part on the realism score for the adversarial example.

Another example aspect of the present disclosure is directed to a computer-implemented method. The method includes obtaining, by one or more computing devices, a training example for a machine-learned model. The method includes generating, by the one or more computing devices, an adversarial example from the training example according to one or more hyperparameters. The method includes generating, by the one or more computing devices, a score for the adversarial example. The score represents a position of the adversarial example relative to a position of the training example in an input data space for the model. The method includes adjusting, by the one or more computing devices, at least one of the one or more hyperparameters based at least in part on the score for the adversarial example. The method includes generating, by the one or more computing devices, an additional adversarial example according to the adjusted one or more hyperparameters. The method includes training, by the one or more computing devices, the machine-learned model based at least in part on the additional adversarial example.

Another example aspect of the present disclosure is directed to a mobile computing device. The mobile computing device includes an application. The application includes a machine-learned model. The mobile computing device includes one or more processors and an on-device adversarial training platform implemented by the one or more processors. The on-device adversarial training platform is configured to perform operations. The operations include obtaining a training example for the machine-learned model. The operations include generating an adversarial example from the training example according to one or more hyperparameters. The operations include providing the adversarial example to the application via an application programming interface. The operations include receiving a realism score for the adversarial example from the application via the application programming interface. The realism score indicates whether the adversarial example appears realistic. The operations include adjusting at least one of the one or more hyperparameters based at least in part on the realism score for the adversarial example received from the application via the application programming interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
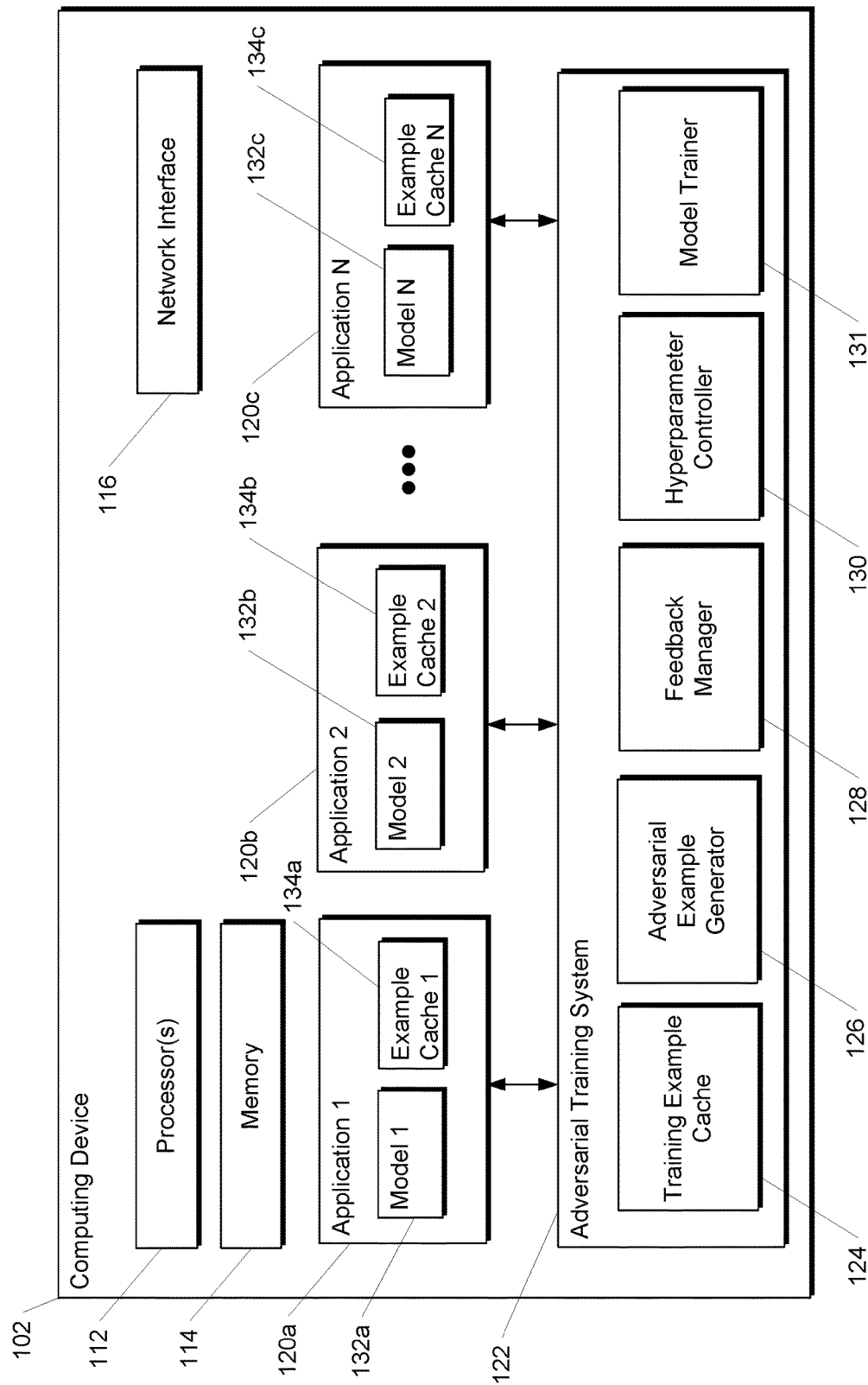
FIG. 1 depicts a block diagram of an example computing device according to example embodiments of the present disclosure.

Reference numerals that are repeated across plural figures are intended to identify the same features in various implementations.

DETAILED DESCRIPTION

Overview

Example aspects of the present disclosure are directed to systems and methods that enable improved adversarial training of machine-learned models. In particular, the present disclosure provides an adversarial training system that generates improved adversarial training examples by optimizing or otherwise tuning one or hyperparameters that guide the process of generating of the adversarial examples. In particular, the adversarial training system can determine, solicit, or otherwise obtain a realism score for an adversarial example generated by the system. The realism score can indicate whether the adversarial example appears realistic. The adversarial training system can adjust or otherwise tune the hyperparameters to produce improved adversarial examples (e.g., adversarial examples that are still high-quality and effective while also appearing more realistic). Through creation and use of such improved adversarial examples, a machine-learned model can be trained to be more robust against (e.g., less susceptible to) various adversarial techniques, thereby improving model, device, network, and user security and privacy.

According to one aspect of the present disclosure, the adversarial training system can communicate or otherwise cooperatively operate with one or more distinct components or systems (e.g., an application that includes a machine-learned model) by way of one or more application programming interfaces (APIs). For example, the adversarial training system can adversarially train a machine-learned model by passing data back and forth with a component (e.g., application) that is responsible for and/or runs the machine-learned model.

Thus, a machine learning API provided by the present disclosure can allow the adversarial training system to support adversarial training for any model. In addition, the adversarial training system can provide a set of utilities through which developers can make use of this API to fine-tune the hyperparameters that guide generation of adversarial examples for their models. In particular, in one particular example, the adversarial training system can provide a newly generated adversarial example to an application via an API. The application can assess the realism of the adversarial example to generate a realism score and then the application can provide the realism score to the adversarial training system via the API. As examples, the application can assess the realism score of the adversarial example according to some heuristic or scoring function and/or by providing (e.g., displaying) the example to a user and seeking user feedback regarding whether the example appears realistic. Thus, in some implementations, the adversarial training system uses or otherwise leverages application-specific user feedback or programmatic heuristics to improve adversarial training of the corresponding machine-learned model, without the need for the developers of the application to specifically understand how the adversarial training system works internally.

More particularly, a computing system can implement an adversarial training system. The computing system can include one or more computing devices. As one example, in some implementations, a user computing device (e.g., a smartphone, tablet, laptop, etc.) can locally implement the adversarial training system as an on-device platform. For example, the user computing device can operate to provide the adversarial training system as a service (e.g., via one or more APIs) to machine-learned models locally stored on the device (e.g., included in one or more applications installed on and executed by the device). As another example, in some implementations, a server computing system can implement the adversarial training system as a service that is accessible to devices over a network (e.g., via one or more APIs). As yet another example, certain aspects of the adversarial training system can be performed on-device (e.g., by the user computing device) while other aspects of the adversarial training system can be performed by the server computing system.

According to an aspect of the present disclosure, the adversarial training system can obtain a training example for a machine-learned model. The training example can be a training example intended for use in training the machine-learned model. For example, the training example can be a positive training example for a certain model output. The training example can be part of an initial training batch or can be part of a new training batch for model update or re-training.

As one example, in some implementations, the training example can be a personal training example that is stored at a local memory of the user computing device. The machine-learned model can also be stored at the local memory of the user computing device. Thus, in some implementations, the adversarial training system can be performed on-device to perform personalized adversarial training that is seeded with personal training examples. This personalized adversarial training can be combined with other on-device training techniques such as, for example, personalized learning frameworks and/or federated learning frameworks, in which model updates are computed locally and then communicated to a centralized system for aggregation to determine a global update.

According to another aspect of the present disclosure, the adversarial training system can generate an adversarial example from the training example according to one or more hyperparameters. In some implementations, the adversarial training system can generate the adversarial example by determining a direction of a gradient of a loss function that evaluates an output provided by the machine-learned model when given at least a portion of the training example as an input. The adversarial training system can perturb the training example in a second direction that is based on (e.g., opposite to) the direction of the gradient of the loss function to generate the adversarial example. As one example, the adversarial training system can treat the input data as optimizable parameters and backpropagate the loss function all the way through the model and further through the input data to modify the input data (e.g., in the second direction). In some implementations, the model parameters can be fixed during such backpropagation. Other techniques for generating adversarial examples can be used as well in addition or alternatively to the opposite gradient direction technique described above.

More particularly, adversarial training allows for every batch of training examples to generate several adversarial versions of them by, for example, perturbing the training example intentionally in the opposite direction than the one in which the model is moving to by training on that sample. In some implementations, this can mean taking a step in a direction other than the gradient for the training example.

According to an aspect of the present disclosure, the adversarial training system can generate the adversarial training example according to or in accordance with one or more hyperparameters. The hyperparameters can be configurable parameters of the generation process.

As one example, the one or more hyperparameters can include a step size hyperparameter that controls a magnitude of a step in the second direction performed when perturbing the training example (e.g., according to the backpropagation technique described above). In some instances, the step size hyperparameter can be referred to or otherwise represented by an epsilon.

In particular, to make sure the resulting adversarial examples are realistic, it is useful to generally know how far the generation process is allowed to move in the input space. Larger steps can generate more effective or meaningful adversarial examples. However, step sizes that are too large can result in adversarial examples that do not appear realistic and therefore do not assist in combating adversarial techniques that rely on realistic, but malicious input data.

As another example, the one or more hyperparameters can include a norm hyperparameter that controls a norm applied to the gradient prior to said perturbing. For example, the norm hyperparameter can control whether the norm of the gradient is taken when determining the second direction. Further, if the norm is to be taken, the norm hyperparameter can control which norm is applied. Example norms that can be applied include the infinity norm, the L2 norm, or other norms.

As yet another example, the one or more hyperparameters can include a loss hyperparameter that controls the loss function for which the gradient is determined. As examples, example losses that can be used as the loss function include a cross-entropy loss, a cost of loss, or other loss functions. Furthermore, in some implementations, an additional perturbation function can be applied on top of the gradient and can be controlled by the loss hyperparameter and/or other hyperparameters.

As another example, the one or more hyperparameters can include whether to perform iterative perturbations to the sample. As further example, in the event iterative perturbations are to be performed, an additional example hyperparameter can control how many iterations should be performed or how to modify various settings, controls, etc. between each iteration.

According to another aspect of the present disclosure, the adversarial training system can determine a realism score for the adversarial example that indicates whether the adversarial example appears realistic. For example, the realism score for the adversarial example can indicate whether the adversarial example appears realistic to a human observer.

In some implementations, to determine the realism score, the adversarial training system can provide the adversarial example to an application via an application programming interface. The application can generate a realism score for the adversarial example. The adversarial training system can receive the realism score for the adversarial example from the application via the application programming interface.

In some implementations, the computing system (e.g., the application and/or the adversarial training system) can determine the realism score for the adversarial example by inputting the adversarial example into a scoring function that heuristically evaluates the adversarial example.

As one example, the scoring function can determine whether the adversarial example still matches an input data space. For example, if the adversarial example exceeds an input boundary or otherwise does not conform to the acceptable input data space, the scoring function can score the adversarial example as being less realistic. In contrast, if the adversarial example matches the input data space, the scoring function can score the adversarial example as being more realistic. As one example of this concept applied to natural language processing inputs, the scoring function can determine whether the adversarial example includes nonsense words or undefined words and, if so, the adversarial example can be viewed as failing to match the input data space.

In some implementations, the scoring function and/or other component can provide and/or perform a corrective action that would allow the adversarial example to become compliant with the input data space.

As another example, for adversarial examples that include imagery, the scoring function can determine an L2 distance between pixel values of the imagery. The scoring function can provide a realism score based at least in part on the L2 distance(s). Many other and different scoring functions can be used to assess the realism of input data of other and different types.

In some implementations, in addition or alternatively to applying a scoring function, the computing system (e.g., the application and/or the adversarial training system) can determine the realism score for the adversarial example by providing the adversarial example for display to a human user and receiving feedback from the human user that indicates whether the adversarial example appears realistic.

In some implementations, the adversarial training system can determine whether to keep (e.g., for use in adversarially training the machine-learned model) or discard the adversarial example based at least in part on the realism score. As one example, when the realism score is greater than a threshold score, the adversarial training system can store the adversarial example for use in training the machine-learned model. In contrast, when the realism score is less than the threshold score, the adversarial training system can discard the adversarial example. In some implementations, the threshold score can be a user-configurable variable.

According to another aspect of the present disclosure, the adversarial training system can adjust at least one of the one or more hyperparameters based at least in part on the realism score for the adversarial example. For example, the adversarial training system can tweak the hyperparameters in a way which will provide more realistic adversarial samples. For example, this may include reducing the step size hyperparameter, changing the norm hyperparameter, changing the loss hyperparameter, and/or increasing the iteration count hyperparameter.

After adjusting the hyperparameter(s), the adversarial training system can generate an additional adversarial example according to the adjusted hyperparameters. The adversarial training system or other training component can train the machine-learned model based at least in part on the additional adversarial example. For example, the additional adversarial example can be designated as a positive training example for a class that would be recognized by a human observer.

According to another aspect of the present disclosure, the adversarial training system can iteratively generate and evaluate (e.g., determine a realism score for) adversarial training examples. For example, the adversarial training system can iteratively generate and evaluate adversarial training examples until the generated adversarial example(s) satisfy one or more criteria. For example, the adversarial training system can iteratively adjust one or more hyperparameters until a most recent realism score exceeds a threshold score; until a moving average of realism scores exceeds the threshold score; and/or until other one or more other criteria are met. In some implementations, the threshold score can be a user-configurable variable. In such fashion, the adversarial training system can iteratively generate and evaluate adversarial training examples until a desired balance between realism and significance is reached.

As one example, the adversarial training system can iteratively reduce a step size hyperparameter that controls a magnitude of a step performed when generating the adversarial example. For example, the adversarial training system can iteratively reduce the step size hyperparameter until a most recent realism score exceeds a threshold score; until a moving average of realism scores exceeds the threshold score; and/or until one or more other criteria are met.

It will be appreciated that, in these implementations, the generation of effective, application-specific adversarial examples allows the model to be effectively trained against malicious adversarial attacks and thereby increases the security of the system against such attacks.

A number of different features can be built on top of the adversarial training system, and their characteristics can depend on the application. As one example application, a recommendation system can be trained on-device for personalization. The recommendation system can train on all the samples the user generates and in this process might ask the user follow-up questions that would in fact be the adversarial samples generated by the adversarial training system. For example, if the user selects to watch a superhero movie on a streaming service, then through the adversarial training one hard/close sample would be whether the user likes superhero content in general, and this could be rendered as a question explicitly. Alternatively, the system could just recommend this hard sample as one of the next videos, and use it as negative if the user dismisses the recommendation.

In another example application, an optical character recognition application could make use of the adversarial training system by showing the user a perturbed version of a photograph that was uploaded for recognition. The application could ask the user whether the perturbed photograph is still understandable (e.g., readable).

According to another aspect, in some implementations, without making use of the gradients, the adversarial training system can also be built by exploring what the models results are for all the neighbors of a sample (which in some instances is referred to as a "saliency map"). As another example, in some implementations, the system can make use of generative adversarial networks to have a neural network trained jointly instead of using more generic scoring heuristics.

The systems and methods of the present disclosure provide a number of technical effects and benefits. As one example technical effect and benefit, the systems and methods of the present disclosure can train machine-learned models more robustly against adversarial attacks. This can improve model, device, network, and user security and privacy. For example, as outlined above, the model may be less susceptible to attempts by a fraudulent party to gain access to, or otherwise fraudulently instruct, a computing system using an adversarial attack.

As another example technical effect and benefit, the systems and methods of the present disclosure can improve the overall quality of the model by enabling the model to make better predictions. Thus, the performance of the model itself and, therefore, the performance of the system which relies upon the model's inferences can be improved.

As another example technical effect and benefit, the systems and methods of the present disclosure can provide a centralized adversarial training service so that applications do not need to each include the full systems and capability to perform adversarial training. As such, a given application is not required to adversarially train machine-learned model(s) but can instead simply communicate with the adversarial training system to adversarially train the model(s). This can enable the data size of applications to be smaller. It can also simplify the development and deployment of applications or other clients as application developers are not required to learn the intricacies of adversarial training but can instead simply rely upon usage of the system APIs.

As yet another example technical effect and benefit, in implementations in which the adversarial training system is implemented as an on-device platform, the systems and methods of the present disclosure can improve communication network efficiency and usage. That is, under past paradigms where adversarial training is performed by a server rather than on-device, various types of information (e.g., input data, training examples, inferences, model parameters, etc.) were required to be transmitted by the server to the device over a communications network (e.g., the Internet). However, since the present disclosure enables on-device adversarial training and/or other machine learning tasks or functionality, such information is not required to be transmitted (at least in every instance) over a communications network. Therefore, communications network traffic, efficiency, and usage are improved. In addition, since the input data, training examples etc. is not being transmitted to and from a server, the security of the data may be increased.

Example Devices and Systems

FIG. 1 depicts a block diagram of an example computing device 102 that includes an adversarial training system 122 according to example embodiments of the present disclosure. Device 102 is provided as one example only. Many different devices and systems can be used to implement aspects of the present disclosure.

The computing device 102 can be any type of computing device including, for example, a desktop, a laptop, a tablet computing device, a smartphone, a computing device that is able to be worn, a gaming console, an embedding computing device, or other forms of computing devices. Thus, in some implementations, the computing device 102 can be a mobile computing device and/or a user computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data and instructions which are executed by the processor 112 to cause the computing device 102 to perform operations. The computing device 102 can also include a network interface 116 that enables communications over one or more networks (e.g., the Internet).

The computing device 102 can store or otherwise include one or more applications 120a-c (e.g., mobile applications). One or more of the applications 120a-c may have one or more machine-learned models that the applications want to adversarially train. For example, the application 120a can include a first machine-learned model 132a and a first training example cache 134a. Likewise, the application 120b can have a machine-learned model 132b and a training example cache 134b while the application 120c can have a machine-learned model 132c and a training example cache 134c. Some applications can include multiple machine learned models. However, some applications may not have machine-learned models. In some implementations, the adversarial training system can also include its own training example cache 124.

In some implementations, one or more of the applications 120a-c can further include a respective machine learning library. The machine learning libraries can include one or more machine learning engines (e.g., a TensorFlow engine), a neural network library, and/or other components that enable implementation of machine-learned models 132a-c for inference and/or training. In other implementations, the machine learning libraries can be stored at and/or implemented by the adversarial training system 122 and provided as a service to the applications 120a-c by the adversarial training system 122.

The adversarial training system 122 enables improved adversarial training of the machine-learned models 132a-c. In particular, the adversarial training system 122 can generate improved adversarial training examples by optimizing or otherwise tuning one or hyperparameters that guide an adversarial example generator 126 that generates the adversarial examples.

In particular, the adversarial training system 122 can determine, solicit, or otherwise obtain a realism score for an adversarial example generated by the system 122. As one example, a feedback manager 128 can communicate with the applications 120a-c (e.g., via an API) to obtain feedback in the form of a realism score.

The realism score can indicate whether the adversarial example appears realistic. The adversarial training system 122 can adjust or otherwise tune the hyperparameters to produce improved adversarial examples (e.g., adversarial examples that are still high-quality and effective while also appearing more realistic). Through creation and use of such improved adversarial examples, a machine-learned model can be trained to be more robust against (e.g., less susceptible to) various adversarial techniques, thereby improving model, device, network, and user security and privacy.

According to one aspect of the present disclosure, the adversarial training system 122 can communicate or otherwise cooperatively operate with one or more distinct components or systems (e.g., application 120a that includes machine-learned model 132a) by way of one or more application programming interfaces (APIs). For example, the adversarial training system 122 can adversarially train the machine-learned model 132a by passing data back and forth with the application 120a that is responsible for and/or runs the machine-learned model 132a.

Thus, a machine learning API can allow the adversarial training system 122 to support adversarial training for any model. In addition, the adversarial training system 122 can provide a set of utilities through which developers can make use of this API to fine-tune the hyperparameters that guide generation of adversarial examples for their models.

In particular, in one particular example, the feedback manager 128 can provide a newly generated adversarial example to application 120a via an API. The application 120a can assess the realism of the adversarial example to generate a realism score and then the application 120a can provide the realism score to the feedback manager 128 via the API. As examples, the application 120a can assess the realism score of the adversarial example according to some heuristic or scoring function and/or by providing (e.g., displaying) the example to a user and seeking user feedback regarding whether the example appears realistic. Thus, in some implementations, the adversarial training system 122 uses or otherwise leverages application-specific user feedback or programmatic heuristics to improve adversarial training of the corresponding machine-learned model, without the need for the developers of the application to specifically understand how the adversarial training system works internally.

According to an aspect of the present disclosure, the adversarial training system 122 can obtain a training example for a machine-learned model. The training example can be a training example intended for use in training the machine-learned model. For example, the training example can be a positive training example for a certain model output. The training example can be part of an initial training batch or can be part of a new training batch for model update or re-training.

As one example, in some implementations, the training example can be a personal training example that is stored at a local memory of the user computing device 102. The machine-learned model can also be stored at the local memory of the user computing device. Thus, in some implementations, the adversarial training system can be performed on-device to perform personalized adversarial training that is seeded with personal training examples. This personalized adversarial training can be combined with other on-device training techniques such as, for example, personalized learning frameworks and/or federated learning frameworks, in which model updates are computed locally and then communicated to a centralized system for aggregation to determine a global update.

In one example, the adversarial training system 122 can obtain the training example from a training example cache 124 maintained by the adversarial training system 122. For example, these training examples can be generic or cross-application training examples. In another example, the adversarial training system 122 can obtain the training example from a training example cache (e.g., cache 134a) stored or otherwise maintained by an application (e.g., application 120a). For example, the application can pass the training example to the adversarial training system 122 using an API.

According to another aspect of the present disclosure, the adversarial example generator 126 of the adversarial training system 122 can generate an adversarial example from the training example according to one or more hyperparameters. In some implementations, the adversarial example generator 126 can generate the adversarial example by determining a direction of a gradient of a loss function that evaluates an output provided by the machine-learned model when given at least a portion of the training example as an input. The adversarial example generator 126 can perturb the training example in a second direction that is based on (e.g., opposite to) the direction of the gradient of the loss function to generate the adversarial example.

As one example, the adversarial example generator 126 can treat the input data as optimizable parameters and backpropagate the loss function all the way through the model and further through the input data to modify the input data (e.g., in the second direction). In some implementations, the model parameters can be fixed during such backpropagation while the input data (e.g., the original training example) is treated as optimizable. Other techniques for generating adversarial examples can be used as well in addition or alternatively to the opposite gradient direction technique described above.

More particularly, adversarial training allows for every batch of training examples to generate several adversarial versions of them by, for example, perturbing the training example intentionally in the opposite direction than the one in which the model is moving to by training on that sample. In some implementations, this can mean taking a step in a direction other than the gradient for the training example.

According to an aspect of the present disclosure, the adversarial example generator 126 can generate the adversarial training example according to or in accordance with one or more hyperparameters. The hyperparameters can be configurable parameters of the generation process.

As one example, the one or more hyperparameters can include a step size hyperparameter that controls a magnitude of a step in the second direction performed when perturbing the training example (e.g., according to the backpropagation technique described above). In some instances, the step size hyperparameter can be referred to or otherwise represented by an epsilon.

In particular, to make sure the resulting adversarial examples are realistic, it is useful to generally know how far the generation process is allowed to move in the input space. Larger steps can generate more effective or meaningful adversarial examples. However, step sizes that are too large can result in adversarial examples that do not appear realistic and therefore do not assist in combating adversarial techniques that rely on realistic, but malicious input data.

As another example, the one or more hyperparameters can include a norm hyperparameter that controls a norm applied to the gradient prior to said perturbing. For example, the norm hyperparameter can control whether the norm of the gradient is taken when determining the second direction. Further, if the norm is to be taken, the norm hyperparameter can control which norm is applied. Example norms that can be applied include the infinity norm, the L2 norm, or other norms.

As yet another example, the one or more hyperparameters can include a loss hyperparameter that controls the loss function for which the gradient is determined. As examples, example losses that can be used as the loss function include a cross-entropy loss, a cost of loss, or other loss functions. Furthermore, in some implementations, an additional perturbation function can be applied on top of the gradient (e.g., as an additional layer between the model and the input data during backpropagation) and can be controlled by the loss hyperparameter and/or other hyperparameters.

As another example, the one or more hyperparameters can include whether to perform iterative perturbations to the sample. As further example, in the event iterative perturbations are to be performed, an additional example hyperparameter can control how many iterations should be performed or how to modify various settings, controls, etc. between each iteration.

According to another aspect of the present disclosure, the feedback manager 128 of the adversarial training system 122 can determine a realism score for the adversarial example that indicates whether the adversarial example appears realistic. For example, the realism score for the adversarial example can indicate whether the adversarial example appears realistic to a human observer.

In some implementations, to determine the realism score, the feedback manager 128 can provide the adversarial example to an application via an API. The application can generate a realism score for the adversarial example. The feedback manager 128 can receive the realism score for the adversarial example from the application via the application programming interface.

In some implementations, the computing system (e.g., the application and/or the feedback manager 128) can determine the realism score for the adversarial example by inputting the adversarial example into a scoring function that heuristically evaluates the adversarial example.

As one example, the scoring function can determine whether the adversarial example still matches an input data space. For example, if the adversarial example exceeds an input boundary or otherwise does not conform to the acceptable input data space, the scoring function can score the adversarial example as being less realistic. In contrast, if the adversarial example matches the input data space, the scoring function can score the adversarial example as being more realistic. As one example of this concept applied to natural language processing inputs, the scoring function can determine whether the adversarial example includes nonsense words or undefined words and, if so, the adversarial example can be viewed as failing to match the input data space.

In some implementations, the scoring function and/or other component can provide and/or perform a corrective action that would allow the adversarial example to become compliant with the input data space.

As another example, for adversarial examples that include imagery, the scoring function can determine an L2 distance between pixel values of the imagery. The scoring function can provide a realism score based at least in part on the L2 distance(s). Many other and different scoring functions can be used to assess the realism of input data of other and different types.

In some implementations, in addition or alternatively to applying a scoring function, the computing system (e.g., the application and/or the feedback manager 128) can determine the realism score for the adversarial example by providing the adversarial example for display to a human user and receiving feedback from the human user that indicates whether the adversarial example appears realistic.

In some implementations, the feedback manager 128 can determine whether to keep (e.g., for use in adversarially training the machine-learned model) or discard the adversarial example based at least in part on the realism score. As one example, when the realism score is greater than a threshold score, the feedback manager 128 can store the adversarial example for use in training the machine-learned model. As one example, the adversarial example can be stored in a local memory of the device 102. For example, the adversarial example can be stored in the training example cache 124 of the adversarial training system 122. Alternatively or additionally, the adversarial example can be stored in a training example cache (e.g., cache 134a) of the corresponding application (e.g., application 120a). In contrast, when the realism score is less than the threshold score, the feedback manager 128 can discard the adversarial example. In some implementations, the threshold score can be a user-configurable variable.

According to another aspect of the present disclosure, a hyperparameter controller 130 of the adversarial training system 122 can adjust at least one of the one or more hyperparameters based at least in part on the realism score for the adversarial example. For example, the hyperparameter controller 130 can tweak the hyperparameters in a way which will provide more realistic adversarial samples. For example, this may include reducing the step size hyperparameter, changing the norm hyperparameter, changing the loss hyperparameter, and/or increasing the iteration count hyperparameter.

After adjusting the hyperparameter(s), the adversarial example generator 126 can generate an additional adversarial example according to the adjusted hyperparameters. A model trainer 131 of the adversarial training system 122 or other training component can train the machine-learned model based at least in part on the additional adversarial example. For example, the additional adversarial example can be designated as a positive training example for a class assigned to the adversarial example by a human observer.

The model trainer 131 can use various training or learning techniques, such as, for example, backwards propagation of errors. In some implementations, performing backwards propagation of errors can include performing truncated backpropagation through time. The model trainer 131 can perform a number of generalization techniques (e.g., weight decays, dropouts, etc.) to improve the generalization capability of the models being trained.

According to another aspect of the present disclosure, the adversarial training system 122 can iteratively generate and evaluate (e.g., determine a realism score for) adversarial training examples. For example, the adversarial training system 122 can iteratively generate and evaluate adversarial training examples until the generated adversarial example(s) satisfy one or more criteria. For example, the adversarial training system 122 can iteratively adjust one or more hyperparameters until a most recent realism score exceeds a threshold score; until a moving average of realism scores exceeds the threshold score; and/or until other one or more other criteria are met. In some implementations, the threshold score can be a user-configurable variable. In such fashion, the adversarial training system 122 can iteratively generate and evaluate adversarial training examples until a desired balance between realism and significance is reached.

As one example, the hyperparameter controller 130 can iteratively reduce a step size hyperparameter that controls a magnitude of a step performed when generating the adversarial example. For example, the hyperparameter controller 130 can iteratively reduce the step size hyperparameter until a most recent realism score exceeds a threshold score; until a moving average of realism scores exceeds the threshold score; and/or until one or more other criteria are met.

It will be appreciated that, in these implementations, the generation of effective, application-specific adversarial examples allows the model to be effectively trained against malicious adversarial attacks and thereby increases the security of the system against such attacks.

The adversarial training system 122 may be in the form of one or more computer programs stored locally on the computing device 102 (e.g., a smartphone or tablet), which are configured, when executed by the device 102, to perform machine learning management operations which enable performance of on-device machine learning functions on behalf of one or more locally-stored applications 120a-c or other local clients.

In some implementations, the adversarial training system 122 can be included in or implemented as an application, such as, for example, a mobile application. As one example, in the context of the Android operating system, the on-device adversarial training system 122 can be included in an Android Package Kit (APK) that can be downloaded and/or updated. In another example, the adversarial training system 122 can be included in or implemented as a portion of the operating system of the device 102, rather than as a stand-alone application.

Each of the adversarial example generator 126, feedback manager 128, hyperparameter controller 130, and model trainer 131 include computer logic utilized to provide desired functionality. Each of the adversarial example generator 126, feedback manager 128, hyperparameter controller 130, and model trainer 131 can be implemented in hardware, firmware, and/or software controlling a general purpose processor. For example, in some implementations, each of the adversarial example generator 126, feedback manager 128, hyperparameter controller 130, and model trainer 131 includes program files stored on a storage device, loaded into a memory and executed by one or more processors. In other implementations, each of the adversarial example generator 126, feedback manager 128, hyperparameter controller 130, and model trainer 131 includes one or more sets of computer-executable instructions that are stored in a tangible computer-readable storage medium such as RAM hard disk or optical or magnetic media.

Thus, as illustrated in FIG. 1, the computing device 102 can locally implement the adversarial training system 122 as an on-device platform. For example, the computing device 102 can operate to provide the adversarial training system 122 as a service (e.g., via one or more APIs) to machine-learned models 132a-c locally stored on the device 102 (e.g., included in one or more applications 120a-c installed on and executed by the device 102).

However, in other implementations of the present disclosure, a server computing system can implement the adversarial training system 122 as a service that is accessible to devices over a network (e.g., via one or more APIs). As yet another example, certain aspects of the adversarial training system 122 can be performed on-device (e.g., by the computing device 102) while other aspects of the adversarial training system 122 can be performed by the server computing system.

Figure 2:
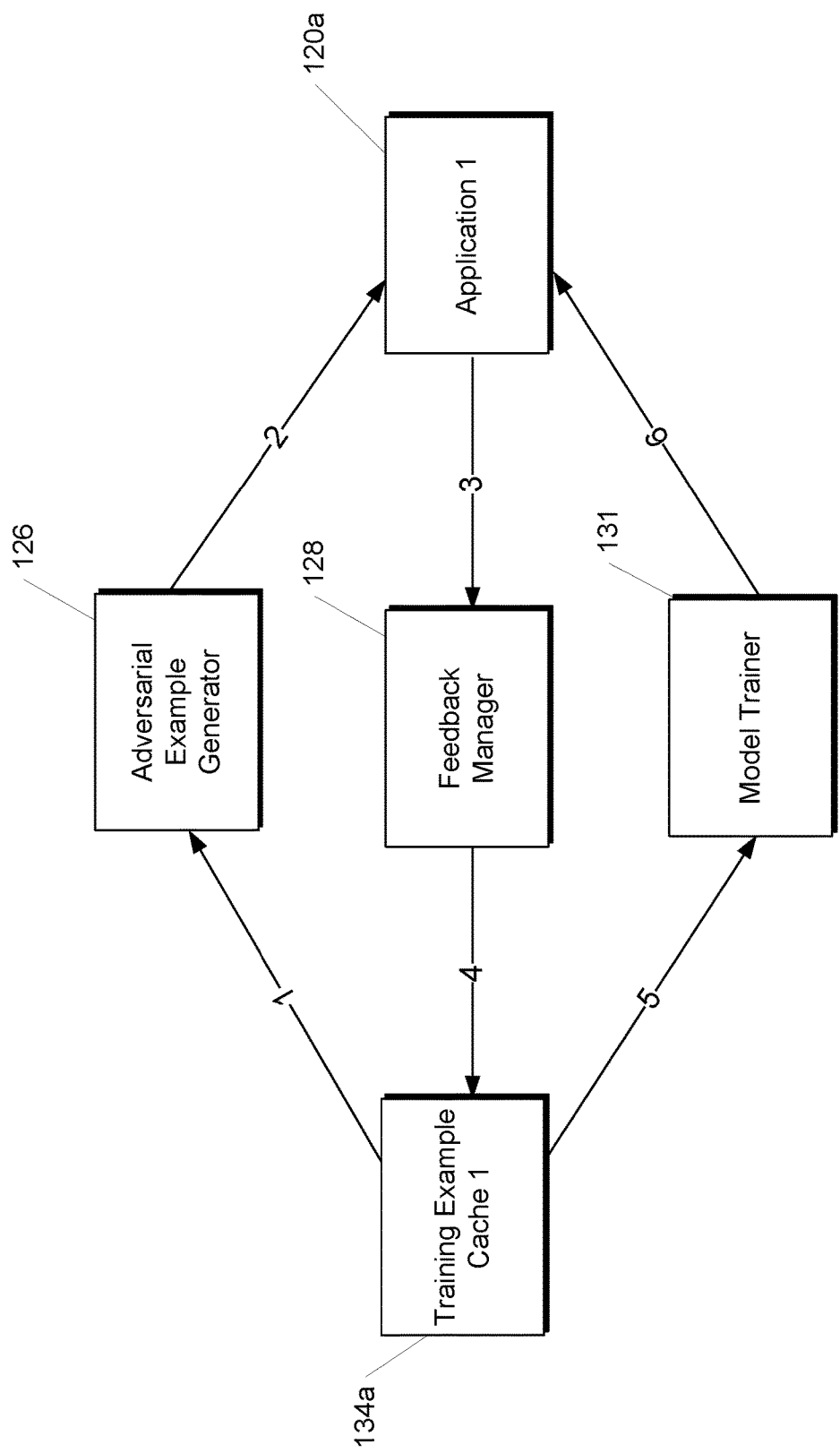
FIG. 2 depicts a graphical diagram of an example process of generating adversarial examples for machine-learned models according to example embodiments of the present disclosure.

FIG. 2 depicts a graphical diagram of an example process of generating adversarial examples for machine-learned models according to example embodiments of the present disclosure. FIG. 2 illustrates one example data flow. Other processes or data flows that differ from that illustrated in FIG. 2 can be used to implement aspects of the present disclosure.

Referring to FIG. 2, at stage 1, a training example is transferred from the training example cache 134a to the adversarial example generator 126 (e.g., via an API). The adversarial example generator 126 generates an adversarial example based on the obtained training example.

At stage 2, the adversarial example generator 126 provides the generated adversarial example to the application 120a (e.g., via an API). The application 120a generates a realism score for the adversarial example.

At stage 3, the application 120a provides the realism score to the feedback manager 128 (e.g., via an API). If the feedback manager 128 determines (e.g., based on the realism score) that the adversarial example should be used to train the model, then at stage 4 the feedback manager 128 provides (e.g., via an API) the adversarial training example for storage in the training example cache 134a (e.g., labelled as a positive training example for a same class or other output label as the original training example obtained from the training example cache 134a).

Next, at stage 5, the adversarial training example is provided (e.g., via an API) from the training example cache 134a to the model trainer 131 (e.g., along with a number of other training examples from the cache 134a).

At stage 6, the model trainer 131 cooperatively communicates with application 120a (e.g., via an API) to train a model used by application 120a based on the training example(s) received from the training example cache 134a, including the adversarial training example.

Figure 3:
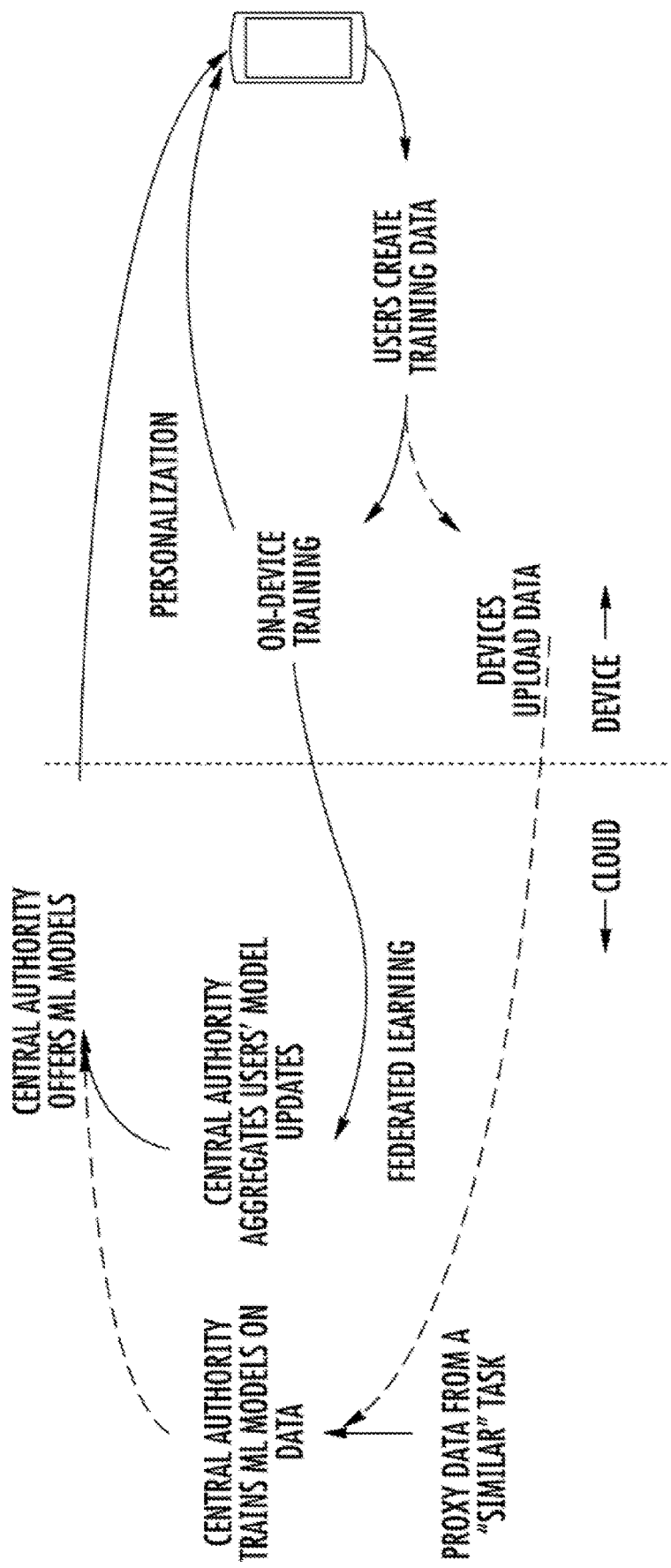
FIG. 3 depicts a graphical diagram of example techniques to train machine-learned models according to example embodiments of the present disclosure.

FIG. 3 depicts a graphical diagram of example personalization and federated learning data flows according to example embodiments of the present disclosure.

More particularly, FIG. 3 depicts three different learning data flows which may in some instances be used in a complementary fashion. In a first data flow, shown primarily in dash line at the bottom of FIG. 3, training data is generated on a user device. The training data is uploaded to a central authority which then trains or re-trains a machine-learned model based on the uploaded data. The model is then sent to the user device for use (e.g., on-device inference).

In a second data flow which can be referred to as personalization or personalized learning, the training data created on the user device is used to train or re-train the model on the device. The re-trained model is then used by such device. This personalized learning enables per-device models to be trained and evaluated without centralized data collection, thereby enhancing data security and user privacy.

In a third data flow which can be referred to as federated learning, the training data created on the user device is used to train or re-train the model on the device. Thus, the actual user-specific training data is not uploaded to the cloud, thereby enhancing data security and user privacy.

However, after such on device learning, the user device can provide an update to a central authority. For example, the update can describe one or more parameters of the re-trained model or one or more changes to the parameters of the model that occurred during the re-training of the model.

The central authority can receive many of such updates from multiple devices and can aggregate the updates to generate an updated global model. The updated global model can then be re-sent to the user device. This scheme enables cross-device models to be trained and evaluated without centralized data collection.

Adversarial training examples generated according to aspects of the present disclosure can be included in the training stages which occur in any of these three data flows.

Example Methods

Figure 4:
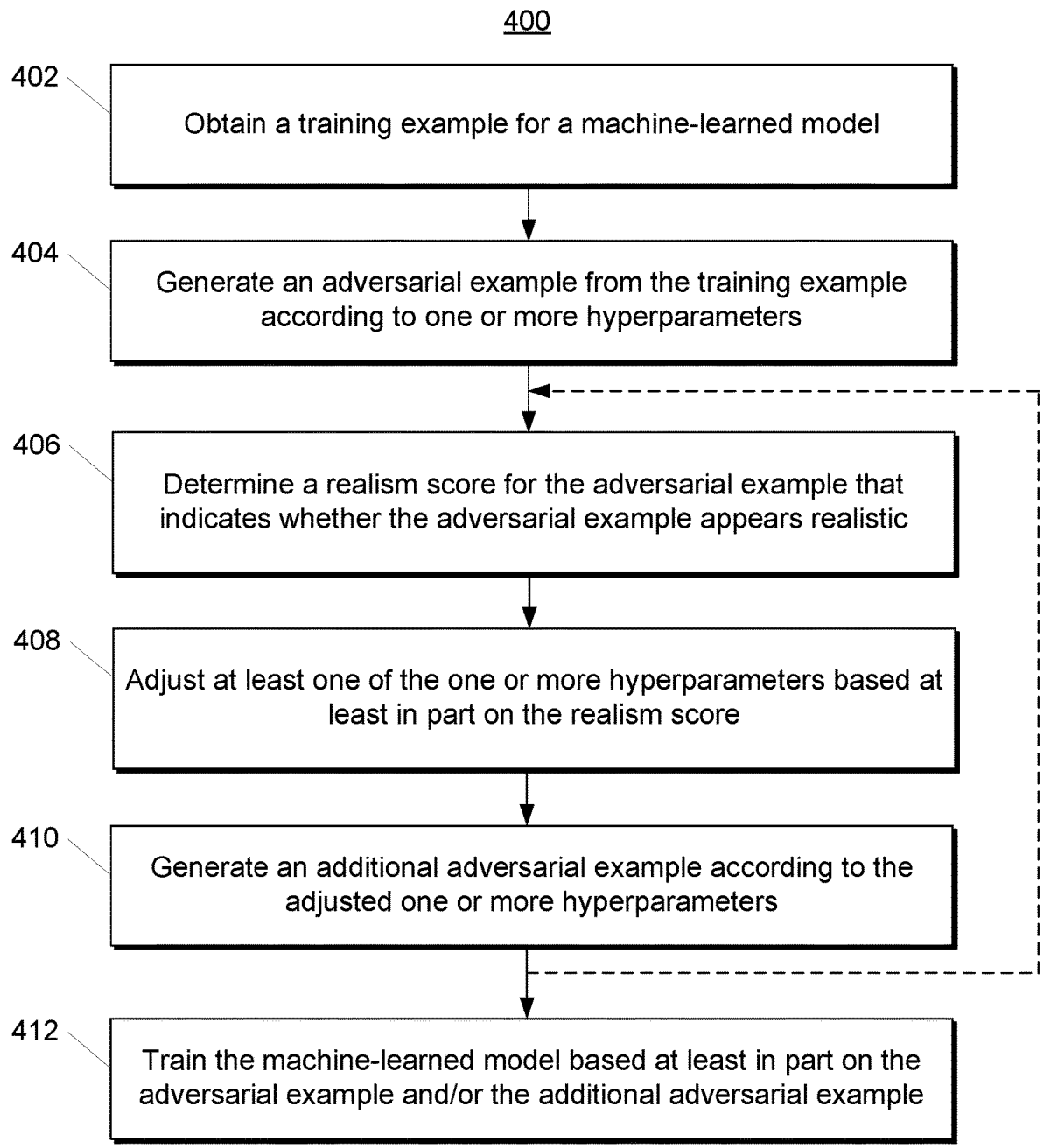
FIG. 4 depicts a flowchart diagram of an example method to enable adversarial training of machine-learned models according to example embodiments of the present disclosure.

FIG. 4 depicts a flowchart diagram of an example method 400 to enable adversarial training of machine-learned models according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can obtain a training example for a machine-learned model. As one example, obtaining the training example at 402 can include obtaining a personal training example that is stored at a local memory of a computing device that performs the method 400. For example, the training example can be obtained from a training example cache maintained by an application that also includes the machine-learned model. As another example, the training example can be obtained from a centralized training example cache stored on a centralized machine learning platform.

At 404, the computing system can generate an adversarial example from the training example. In particular, the computing system can generate the adversarial example according to one or more hyperparameters.

In some implementations, generating the adversarial example from the training example at 404 can include determining a direction of a gradient of a loss function that evaluates an output provided by the machine-learned model when given at least a portion of the training example as an input. Generating the adversarial example from the training example at 404 can further include perturbing the training example in a second direction that is opposite to the direction of the gradient of the loss function to generate the adversarial example.

As one example, one of the hyperparameters can include a step size hyperparameter that controls a magnitude of a step in the second direction performed when perturbing the training example in the second direction. As another example, one of the hyperparameters can include a norm hyperparameter that controls a norm applied to the gradient prior to perturbing the training example. As yet another example, one of the hyperparameters can include a loss hyperparameter that controls the loss function for which the gradient is determined.

At 406, the computing system can determine a realism score for the adversarial example that indicates whether the adversarial example appears realistic. In particular, in some implementations, the realism score for the adversarial example can indicate whether the adversarial example appears realistic to a human observer. In another example, the realism score (or some other form of score generated for the adversarial example) can represent a position of the adversarial example relative to a position of the training example in an input data space for the model.

In some implementations, determining the realism score for the adversarial example at 406 can include providing the adversarial example to an application via an application programming interface and receiving the realism score for the adversarial example from the application via the application programming interface. As yet another example, determining the realism score for the adversarial example at 406 can include providing the adversarial example for display to a human user and receiving feedback from the human user that indicates whether the adversarial example appears realistic. For example, the application can provide the adversarial example for display to the user or a centralized platform can provide the adversarial example for display.

As another example, determining the realism score for the adversarial example at 406 can include inputting the adversarial example into a scoring function that heuristically evaluates the adversarial example. As one example, the scoring function can heuristically evaluate one or more properties of the adversarial example, relative to an input data space, to generate the score.

At 408, the computing system can adjust at least one of the one or more hyperparameters based at least in part on the realism score. As one example, the computing system can reduce a step size hyperparameter. As other examples, the computing system can adjust or otherwise change a loss hyperparameter and/or a norm hyperparameter. In some implementations, the computing system can adjust the one or more hyperparameters according to a binary search scheme.

At 410, the computing system can generate an additional adversarial example according to the adjusted one or more hyperparameters. For example, the same generation process performed at 404 can be performed again except according to the adjusted hyperparameters.

In some implementations, after 410, the method 400 can return to 406 and determine a new realism score for the new additional adversarial example generated at 410. This is indicated in FIG. 4 by the dashed line. Thus, in some implementations, the computing system can iteratively perform blocks 406, 408, and 410 for a plurality of iterations. This can enable iterative improvement in the adversarial example. As one example, the computing system can iteratively reduce a step size hyperparameter that controls a magnitude of a step performed when generating the adversarial example.

As one example, the computing system can iteratively perform blocks 406, 408, and 410 until a most recent realism score exceeds a threshold score; until a running average of realism scores exceeds a threshold value; until an iteration-over-iteration change in realism scores falls below a threshold value, and/or until one or more other criteria are satisfied.

After a final iteration of 410, method 400 proceeds to block 412. In some implementations, the computing system can store each iteratively-generated adversarial training example that received a realism score that is greater than a threshold value while discarding any iteratively-generated adversarial training examples that received a realism score less than the threshold value.

In some implementations, some or all of the threshold scores described above can be user-configurable to all the user to determine an appropriate balance between realism, step size, speed of performance, and/or other trade-offs.

At 412, the computing system can train the machine-learned model based at least in part on the adversarial example and/or the additional adversarial example.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
   obtaining, by one or more computing devices, a training example for a machine-learned model, wherein the training example comprises a plurality of image data values;
   generating, by the one or more computing devices, an adversarial example from the training example by perturbing, by the one or more computing devices, one or more of the plurality of image data values of the training example according to one or more hyperparameters, wherein generating the adversarial example from the training example comprises:
   determining, by the one or more computing devices, a direction of a gradient of a loss function that evaluates an output provided by the machine-learned model when given at least a portion of the training example as an input, and
   perturbing, by the one or more computing devices, the training example in a second direction that is opposite to the direction of the gradient of the loss function to generate the adversarial example;
   determining, by the one or more computing devices, a realism score for the adversarial example, the realism score being based at least in part on user feedback;
   adjusting, automatically by the one or more computing devices, at least one of the one or more hyperparameters based at least in part on the realism score for the adversarial example;
   generating, by the one or more computing devices, an additional adversarial example according to the adjusted one or more hyperparameters; and
   training, by the one or more computing devices, the machine-learned model based at least in part on the additional adversarial example.

2. The computer-implemented method of claim 1, wherein the one or more hyperparameters comprise a step size hyperparameter that controls a magnitude of a step in the second direction performed during said perturbing.

3. The computer-implemented method of claim 1, wherein the one or more hyperparameters comprise one or both of:
   a norm hyperparameter that controls a norm applied to the gradient prior to said perturbing; and
   a loss hyperparameter that controls the loss function for which the gradient is determined.

4. The computer-implemented method of claim 1, wherein determining, by the one or more computing devices, the realism score for the adversarial example comprises:

providing, by an on-device machine-learning platform, the adversarial example to an application via an application programming interface; and receiving, by the on-device machine-learning platform, the realism score for the adversarial example from the application via the application programming interface.

5. The computer-implemented method of claim 1, wherein determining, by the one or more computing devices, the realism score for the adversarial example comprises:

providing, by the one or more computing devices, the adversarial example for display to a human user; and receiving, by the one or more computing devices, feedback from the human user that indicates whether the adversarial example appears realistic.

6. The computer-implemented method of claim 1, further comprising:

iteratively performing said generating, determining, and adjusting until a most recent realism score exceeds a threshold score.

7. The computer-implemented method of claim 6, wherein the threshold score is user-configurable.

8. The computer-implemented method of claim 1, further comprising:

iteratively performing said generating, determining, and adjusting, wherein iteratively performing said generating comprises iteratively reducing a step size hyperparameter that controls a magnitude of a step performed when generating the adversarial example.

9. The computer-implemented method of claim 1, wherein the one or more computing devices consist of a user computing device, wherein obtaining, by the one or more computing devices, the training example comprises obtaining, by the user computing device, a personal training example that is stored at a local memory of the user computing device, and wherein the machine-learned model is also stored at the local memory of the user computing device.

10. The computer-implemented method of claim 1, further comprising:

when the realism score is greater than a threshold score, storing, by the one or more computing devices, the adversarial example for use in training the machine-learned model; and when the realism score is less than the threshold score, discarding, by the one or more computing devices, the adversarial example.

11. A computer-implemented method, comprising:

obtaining, by one or more computing devices, a training example for a machine-learned model, wherein the training example comprises a plurality of data values corresponding to a natural language processing input;

generating, by the one or more computing devices, an adversarial example from the training example by perturbing, by the one or more computing devices, one or more of the plurality of data values of the training example according to one or more hyperparameters;

generating, by the one or more computing devices, a score for the adversarial example, wherein the score indicates nonconformity of the adversarial example to an acceptable input data space for the natural language processing input;

automatically adjusting, by the one or more computing devices, at least one of the one or more hyperparameters based at least in part on the score for the adversarial example, wherein the adjusting is based at least in part on a position of the adversarial example in the input data space relative to a boundary of the acceptable input data space for the model;

generating, by the one or more computing devices, an additional adversarial example according to the adjusted one or more hyperparameters, wherein the additional adversarial example conforms to the input data space; and training, by the one or more computing devices, the machine-learned model based at least in part on the additional adversarial example.

12. The method of claim 11, wherein generating the score comprises:

inputting, by the one or more computing devices, the adversarial example into a scoring function that evaluates one or more properties of the adversarial example, relative to the input data space, to generate the score.

13. The method of claim 11, wherein generating the score comprises:

outputting, by the one or more computing devices, the adversarial example to a user;

receiving, by the one or more computing devices, a user input indicative of the position of the outputted adversarial example relative to the position of the training example in the input data space; and generating, by the one or more computing devices, the score based on the received user input.

14. A mobile computing device comprising:

an application, the application comprising a machine-learned model;

one or more processors; and an on-device adversarial training platform implemented by the one or more processors, the on-device adversarial training platform configured to perform operations comprising:

obtaining a training example for the machine-learned model, wherein the training example comprises a plurality of image data values;

generating an adversarial example from the training example by perturbing one or more of the plurality of image data values of the training example according to one or more hyperparameters, wherein generating the adversarial example from the training example comprises:

determining a direction of a gradient of a loss function that evaluates an output provided by the machine-learned model when given at least a portion of the training example as an input, and perturbing the training example in a second direction that is opposite to the direction of the gradient of the loss function to generate the adversarial example;

providing the adversarial example to the application via an application programming interface;

receiving a realism score for the adversarial example from the application via the application programming interface, the realism score being based at least in part on user feedback;

adjusting, automatically, at least one of the one or more hyperparameters based at least in part on the realism score for the adversarial example received from the application via the application programming interface;

generating an additional adversarial example according to the adjusted one or more hyperparameters; and training the machine-learned model based at least in part on the additional adversarial example.

15. The mobile device of claim 14, wherein the operations comprise:
iteratively performing said generating the adversarial example, receiving the realism score, and adjusting the at least one of the one or more hyperparameters until a most recent realism score exceeds a threshold score.

16. The mobile device of claim 15, wherein the threshold score is user-configurable.

17. The mobile device of claim 15, wherein iteratively performing said generating the adversarial example comprises iteratively reducing a step size hyperparameter that controls a magnitude of a step performed when generating the adversarial example.

18. The mobile device of claim 14, wherein obtaining the training example comprises obtaining a personal training example that is stored at a local memory of the mobile device, and wherein the machine-learned model is also stored at the local memory of the mobile device.

\* \* \* \* \*